US007298465B2

(12) United States Patent
Dorrer

(10) Patent No.: US 7,298,465 B2
(45) Date of Patent: Nov. 20, 2007

(54) MEASUREMENT AND CHARACTERIZATION OF NONLINEAR PHASE SHIFTS

(75) Inventor: Christophe Dorrer, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 91 days.

(21) Appl. No.: 11/227,051

(22) Filed: Sep. 15, 2005

(65) Prior Publication Data

US 2007/0058158 A1  Mar. 15, 2007

(51) Int. Cl.
G01N 21/00 (2006.01)
(52) U.S. Cl. .................................... 356/73.1
(58) Field of Classification Search ............... None
See application file for complete search history.

(56) References Cited

U.S. PATENT DOCUMENTS 4,887,901 A * 12/1989 Falco et al. ................. 356/480
6,259,552 B1 * 7/2001 Boffi et al. .................. 359/332

OTHER PUBLICATIONS

A.Sagan et al., "Imaging Phase Objects With Square-Root, Foucault and Hoffman Real Filters: A Comparison", Appl.Opt., 42, 5816-5824, 2003.
C.Dorrer, Direct Measurement of the Nonlinear Coefficient Of An Optical Fiber Using Linear Optical Sampling, Electron.Lett., pp. 8-10, 2005.
S.V.Chernikov and J.R. Taylor, "Measurement Of The Normalization Factor Of n2 For Random Polarization In Optical Fibers", Opt.Lett., 21, pp. 1559-1561, 1996.
A.R. Chraplyvy et al., "Phase Modulation To Amplitude Modulation Conversion of CW Laser Light in Optical Fibres", Electron. Lett., 22, pp. 409-411, 1986.
L.P.Barry et al., Simultaneous Measurements of Optical Fibre Non Linearity and Dispersion Using Frequency Resolved Optical Gating, Electron. Lett., 33, pp. 707-708, 1997.
C.Dorrer et al., "Simultaneous Temporal Characterization of Telecommunication Optical Pulses and Modulators by use of Spectrograms", Opt. Lett., 27, pp. 1315-1317, 2002.
M.Sheik -bahae et al., "High Sensitivity, Single-beam n2 Measurements", Opt. Lett., 14, pp. 955-957, 1989.
R.H.Stolen et al., "Self-phase-modulation in Silica Optical Fibers", Physical Review, 17, pp. 1448-1454, 1977.
A.J. Taylor et al., "Determination of n2 by Direct Measurement of the Optical Phase", Opt. Lett., 21, pp. 1812-1814, 1996.
C. Vinegoni et al., "Determination of nonlinear coefficient n2/Aeff using self-aligned interferometer and Faraday Mirror", Electron. Lett., 36, pp. 886-888, 2000.

* cited by examiner

*Primary Examiner*—Tu T. Nguyen

(57) ABSTRACT

Temporal phase shifts induced by cross-phase modulation in an optical fiber are directly characterized with a spectral equivalent of the Foucault technique used to spatially resolve wavefronts. The temporal phase induced by a high power pulsed pump on a monochromatic probe via cross-phase modulation is converted in a temporal intensity modulation via spectral filtering. A measurement of the modulated instantaneous power of the filtered signal allows to directly determine the time-resolved nonlinear phase shift. Additionally, an equivalent of the transport-of-intensity equation, which links the evolution of the instantaneous power of the electric field in a dispersive medium to the instantaneous values of the power and phase of the field. This derivation permits the measurement of temporal phase shifts using only intensity information in a direct, non-interferometric manner.

9 Claims, 10 Drawing Sheets

MEASUREMENT AND CHARACTERIZATION OF NONLINEAR PHASE SHIFTS

FIELD OF THE INVENTION

The present invention relates generally to the field of photonics and in particular to methods for the measurement and characterization of nonlinear temporal phase shifts.

BACKGROUND OF THE INVENTION

As is known and recognized, nonlinear interactions such as cross-phase modulation (XPM) and self-phase modulation (SPM) directly modify the temporal phase of an optical field. As a result, long-haul optical transmission—where optical pulses are transmitted over long lengths of optical fibers—is impaired. The induced temporal phase shifts can also be used in applications such as pulse compression, regeneration, performance monitoring and photonic logic.

Accordingly, the ability to precisely determine the phase of an optical wave is a necessary requirement of many optical situations. Unfortunately, while the intensity of an optical wave may be obtained directly—using common square-law detectors—the phase of the optical wave can only be measured indirectly, as direct detectors are insensitive to optical phase.

SUMMARY OF THE INVENTION

I have developed techniques to measure nonlinear phase shifts, from which one can determine the nonlinear coefficient of an optical medium.

Viewed from a first aspect, my inventive technique is based on a spectral equivalent of the Foucault technique, which measures the wavefront of a spatially extended optical field by filtering the Fourier spectrum of the field and measuring the resulting intensity in the spatial domain. The filter in the Fourier conjugate domain converts the spatial phase modulation of the input beam into a spatial intensity modulation on the output beam, and the measured modulated intensity is then used to determine the spatial phase.

More particularly, this spectral equivalent acts on a monochromatic source after Cross Phase Modulation (XPM)—induced phase modulation by a pulsed pump source. One filters the phase modulated source in the spectral domain and then measures the temporal intensity of the filtered source. Advantageously, and in sharp contrast to other approaches, my technique can unambiguously determine temporal phase shifts induced by a pump of arbitrary shape by just performing temporal intensity measurements.

Viewed from a second aspect, my inventive technique is directed to a method employing a temporal transport-of-intensity formulation that advantageously permits the measurement of temporal phase shifts using only intensity information in a direct, non-interferometric manner.

Figure 8:
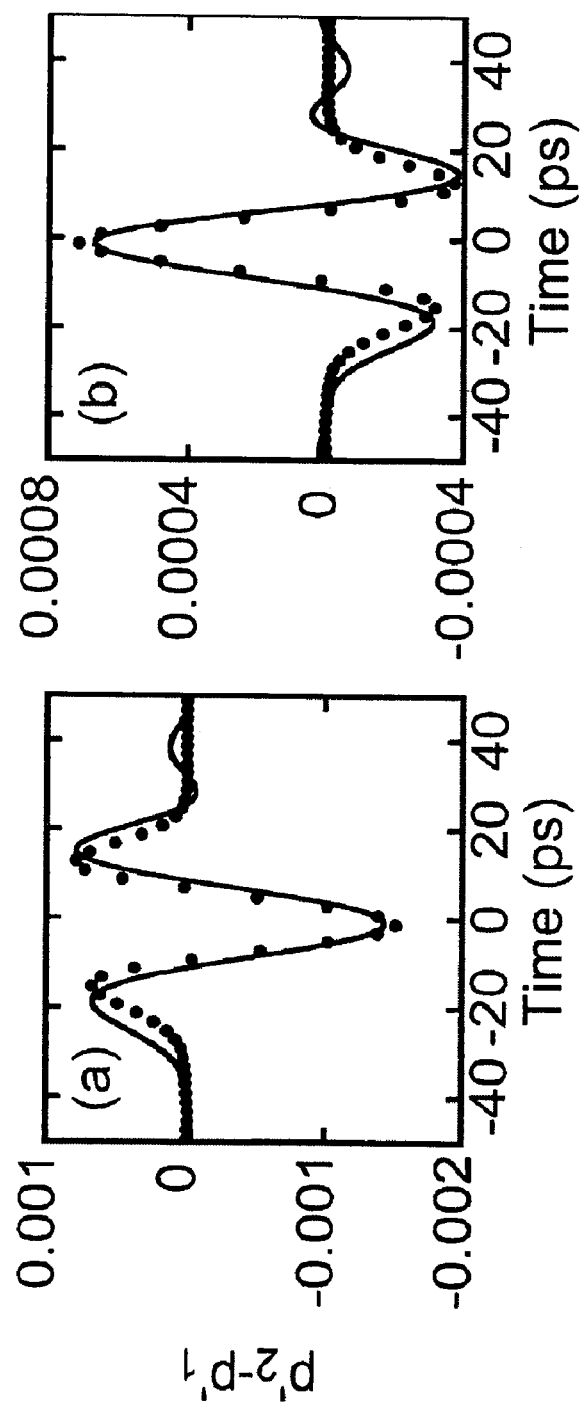
Figure 9:
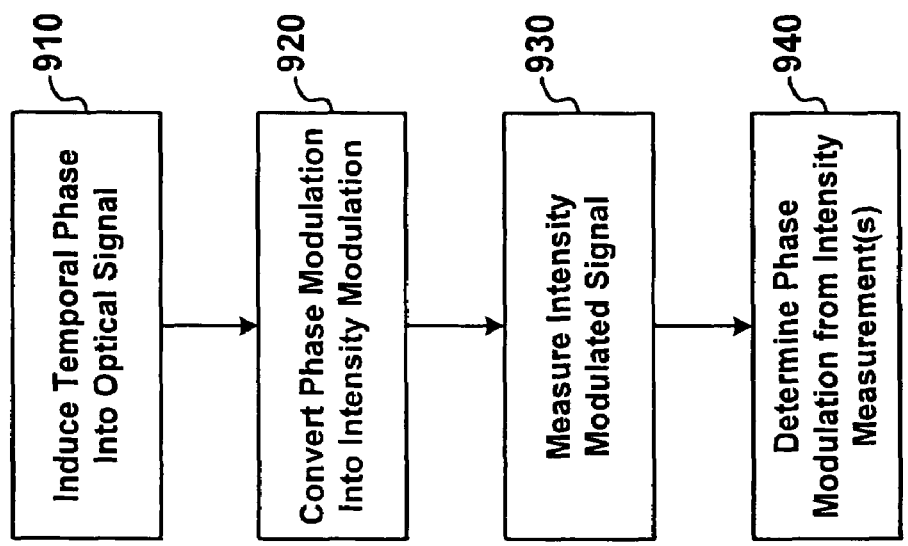

(markers) for the determination of the nonlinear coefficient of a fiber via XPM wherein the average power into the fiber is 5.7 dBm for (a) and (b) and −4.3 dBm for (c) and (d); the dispersive element is the DCF for (a) and (c) and the SSMF for (b) and (d);

FIG. 8(a-b) are graphs showing measured $p'_2(t)−p'_1(t)$ and fitted $$\frac{\partial^2 p^2}{\partial t^2}(t)$$

markers for $P_2−P_1=32$ mW in which the dispersive element is the DCF for (a) and SSMF for (b); and FIG. 9 is a flowchart depicting my inventive method(s) according to the present invention.

DETAILED DESCRIPTION

By way of initial theoretical background, a monochromatic source with power $P_0$ and a pump pulse source with average power P and instantaneous power P·p(t), propagate in a medium with nonlinear coefficient Γ. The propagation induces a temporal phase shift $\phi(t)=\alpha \cdot \Gamma \cdot P \cdot p(t)$ on the monochromatic source, where α is a real constant that depends upon the polarization state of the two sources. For a small phase modulation, the resulting field may be expressed as:

$$\sqrt{P_0}\cdot\exp[i\cdot\phi(t)]\approx\sqrt{P_0}\cdot[1+i\phi(t)].$$

The phase modulation may be converted into an amplitude modulation through the use of Fourier filtering. In the spectral domain, the modulated field is $\sqrt{P_0}\cdot[\delta(\omega)+i\tilde\phi(\omega)]$, which gives $\sqrt{P_0}\cdot[\delta(\omega)\cdot\tau(0)+i\tilde\phi(\omega)\cdot\tau(\omega)]$ after filtering with an element with transfer function $\tau(\omega)$. The power of such field is obtained using a Fourier transform back to the temporal domain as $P'(t)=P_0 \cdot |\tau(0)+i \cdot \phi_\tau(t)|^2 \approx P_0 \cdot |\tau(0)|^2 \cdot [1-2 \text{Im}[\phi_\tau(t)]/\tau(0)]$, where $\phi_\tau$ is the Fourier transform of $\phi \cdot \tau$, Im is the imaginary part of a complex number and $\tau(0)$ is chosen real by proper normalization of the function $\tau$. Reorganizing this equation leads to the relation:

$$p'(t) = \frac{P'(t) - P_0 \cdot |\tau(0)|^2}{P_0 \cdot |\tau(0)|^2} = -\frac{2\alpha \cdot \Gamma \cdot P}{|\tau(0)|} \cdot \text{Im}[p_\tau(t)] \quad [1]$$

where the left-hand side of [1] corresponds to the temporally resolved power of the probe after the filter, with background removal and normalization to the value of the background, while the right-hand side is proportional to the imaginary part of $p_\tau$, which can be calculated from the instantaneous power of the pump p(t) via Fourier transform, multiplication by the known $\tau(\omega)$ and inverse Fourier transform.

Advantageously, the proportionality coefficient directly leads to $\alpha \cdot \Gamma$, and therefore to the nonlinear coefficient of an optical fiber under test. As such, temporal phase shifts may be determined using only two intensity measurements, one for p'(t) and one for p(t), which can be experimentally determined through the use of a sampling oscilloscope or a nonlinear cross-correlation.

While my technique can, in principle, be applied with a wide variety of filters as long as their transfer function is known in amplitude and phase, a simple choice is a filter that is blocks the transmission of light for optical frequencies lower than a given frequency $\omega_0$ and exhibits constant transmission for frequencies higher than $\omega_0$. Such a filter therefore, mimics a Heaviside function. With such a filter (known as the Foucault filter in the wavefront measurement community), the function $p_\tau$ is the Hilbert transform of the function p (See, for example, A. Sagan, S. Nowicki, R. Buczynski, M. Kowalczyk, and T. Szoplik, "Imaging Phase Objects With Square-Root, Foucault and Hoffman Real Filters: A Comparision", Appl. Opt., 42, 5816-5824 (2003)).

Figure 1:
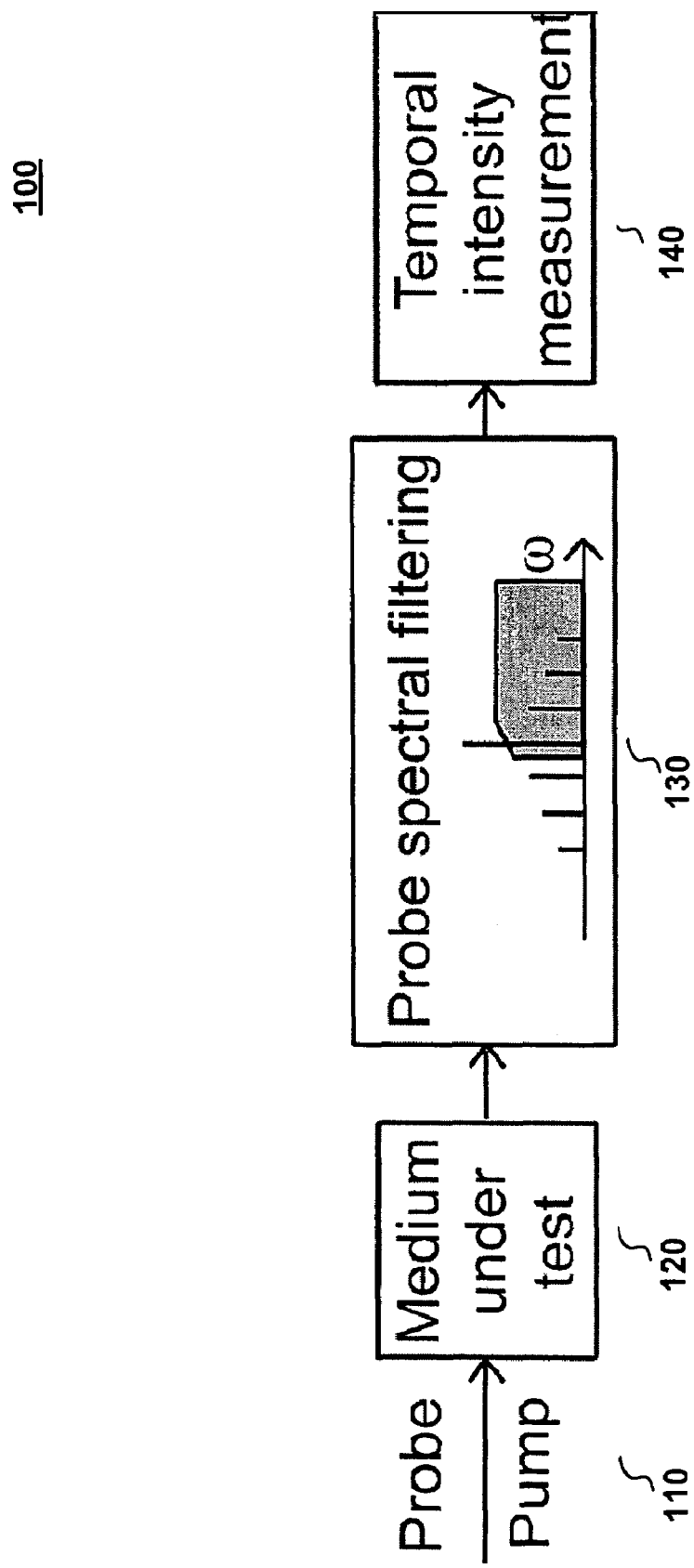
FIG. 1 is a schematic illustrating of my inventive technique for determining temporal phase shifts.

FIG. 1 is a schematic illustration of my inventive spectral Foucault technique for determining temporal phase shifts. With reference to that FIG. 1, there is shown a monochromatic source and a pump pulse 110 propagating in a medium under test 120. The propagation induces a temporal phase shift on the monochromatic source. The temporal phase shift(s) so induced are determined through spectral filtering 130 and the measurement of the resulting intensity 140. the carrier, and blocks the spectral modes having a wavelength lower than that of the carrier With simultaneous reference to FIG. 2B, the optical spectrum of the modulated probe is shown before and after the spectral filter—the latter being shifted down in the FIG. 2B for clarity. The dashed line represents the transmission of the interleaver 240.

Figure 3:
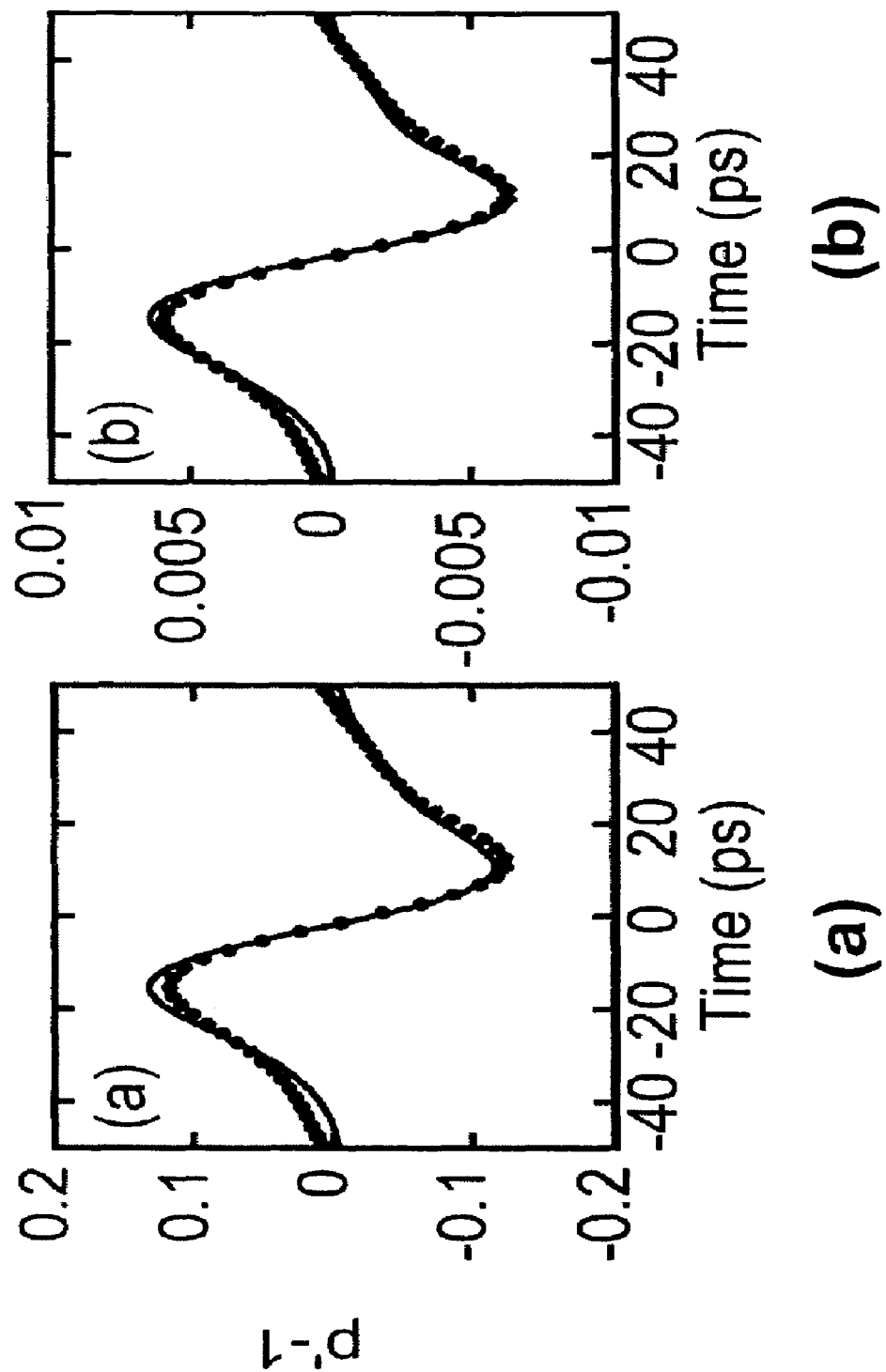
FIG. 3 are graphical examples depicting the fit of the measured p'(t) (continuous line) and calculated $p_\Gamma(t)$ from the measured p(t) (markers) wherein the corresponding peak nonlinear phase shift is 77 mrad for (a) and 3.9 mrad for (b)

The attenuation of the carrier as compared to that of the other spectral modes (the value of $|\tau(0)|$ for the right-hand-side of Eq. 1) was measured precisely using the optical spectra measured before and after the interleaver 240. The correlation between the calculated Hilbert transform of the measured pump instantaneous power and the measured modulated probe is determined using a linear fit, following Eq. 1, which leads to the value of $\alpha \cdot \Gamma$. Two examples of such fit obtained for a peak phase shift of 77 mrad and 3.9 mrad are plotted in FIG. 3(a) and FIG. 3(b), respectively.

The accuracy and sensitivity of my technique were determined by measuring the nonlinear coefficient of the fiber when maximizing the nonlinear phase shift (i.e. when the pump 210 and probe 220 are launched in the fiber under test 230 with identical polarization states, which leads to $\alpha=2$). The peak power was varied, thereby generating phase shifts ranging from 3.9 mrad to 77 mrad and the wavelength of the pump 210 was maintained at 1556 nm.

Figure 2A:
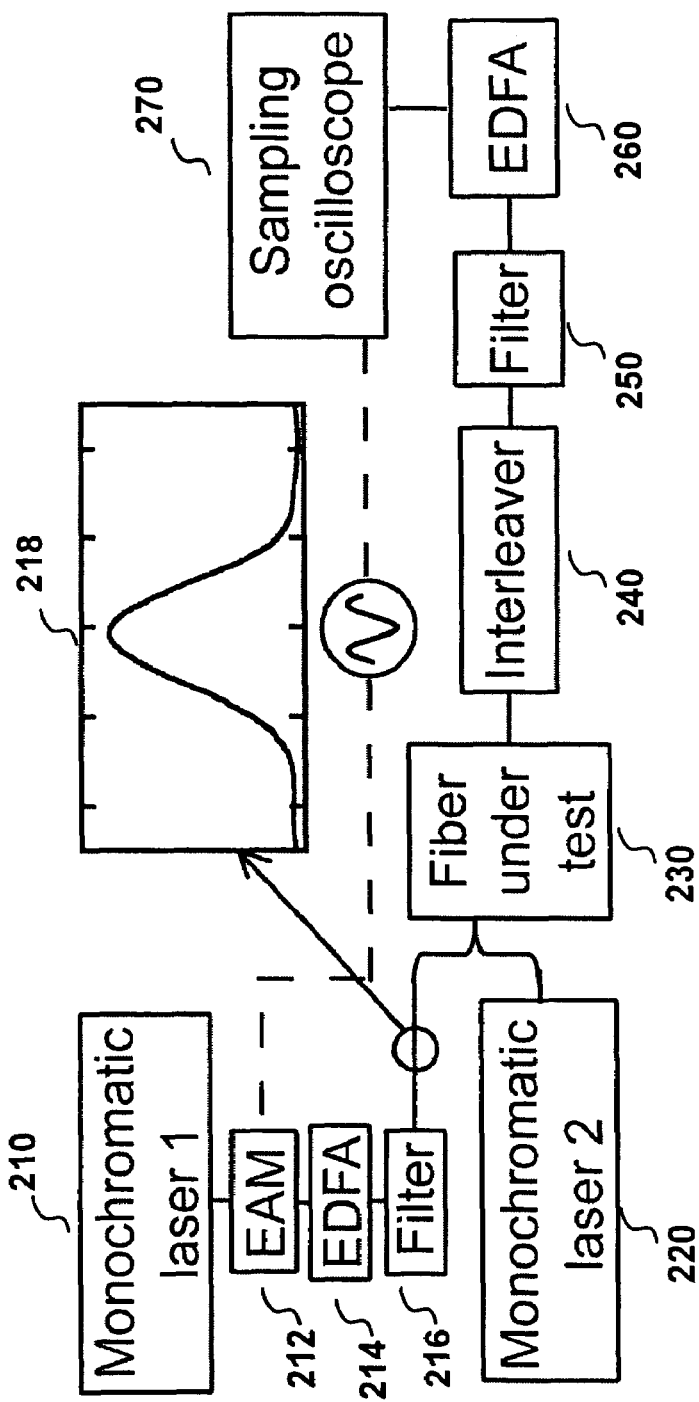
FIG. 2(a) is a schematic illustrating an experimental setup for determination of a nonlinear phase shift induced by cross phase modulation, according to the present invention wherein the inset represents the instantaneous power p(t) in a 100 ps window.
Figure 2B:
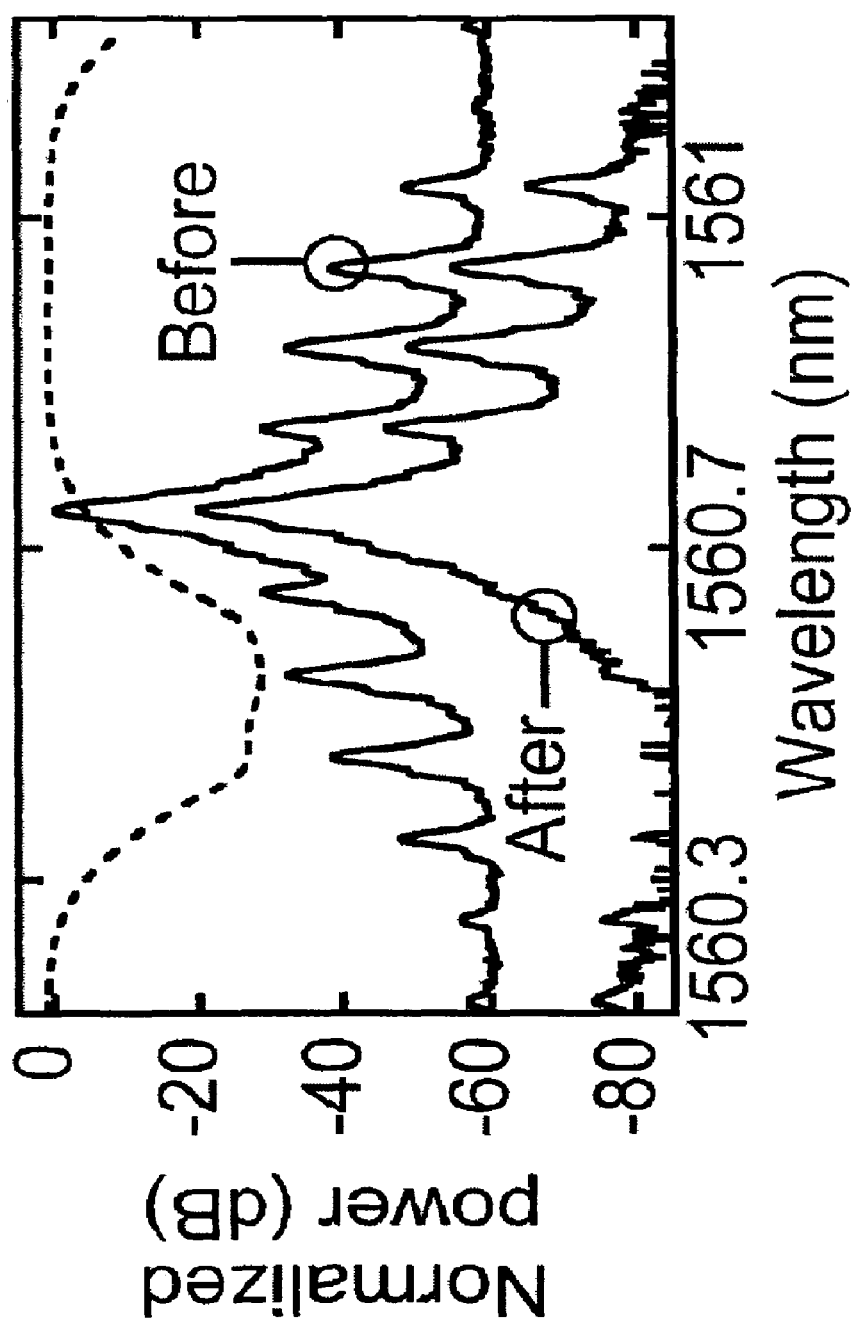
FIG. 2(b) is a graph depicting the optical spectrum of the modulated probe before and after the spectral filter.

We can more completely describe our technique with reference to the experimental setup shown in FIG. 2. More specifically, a pump source is generated by sending monochromatic laser light emitted from monochromatic laser 210 into an electroabsorption modulator (EAM) 212 properly biased and driven by a 10 GHz sinewave. This pulsed, monochromatic source is amplified by EDFA 214 and filtered by filter 216. As can be seen in this FIG. 2, the instantaneous power p(t) of the pulsed source in a 100 ps window is shown in inset, 218.

The pulsed source is coupled with a monochromatic probe set at 1560.7 nm, output from monochromatic laser #2 220, and the combined sources are sent into a fiber under test 230 and subsequently into the interleaver 240.

The output of the interleaver 240 was filtered using a bandpasss filter 250, amplified in an erbium-doped fiber amplifier 260 and subsequently detected using a 30 GHz sampling oscilloscope 270. Advantageously, in this experimental setup, the same sampling oscilloscope 270 was also used to measure the instantaneous power of the pump p(t). The average power of the pump P was measured using a powermeter (not specifically shown).

Figure 4:
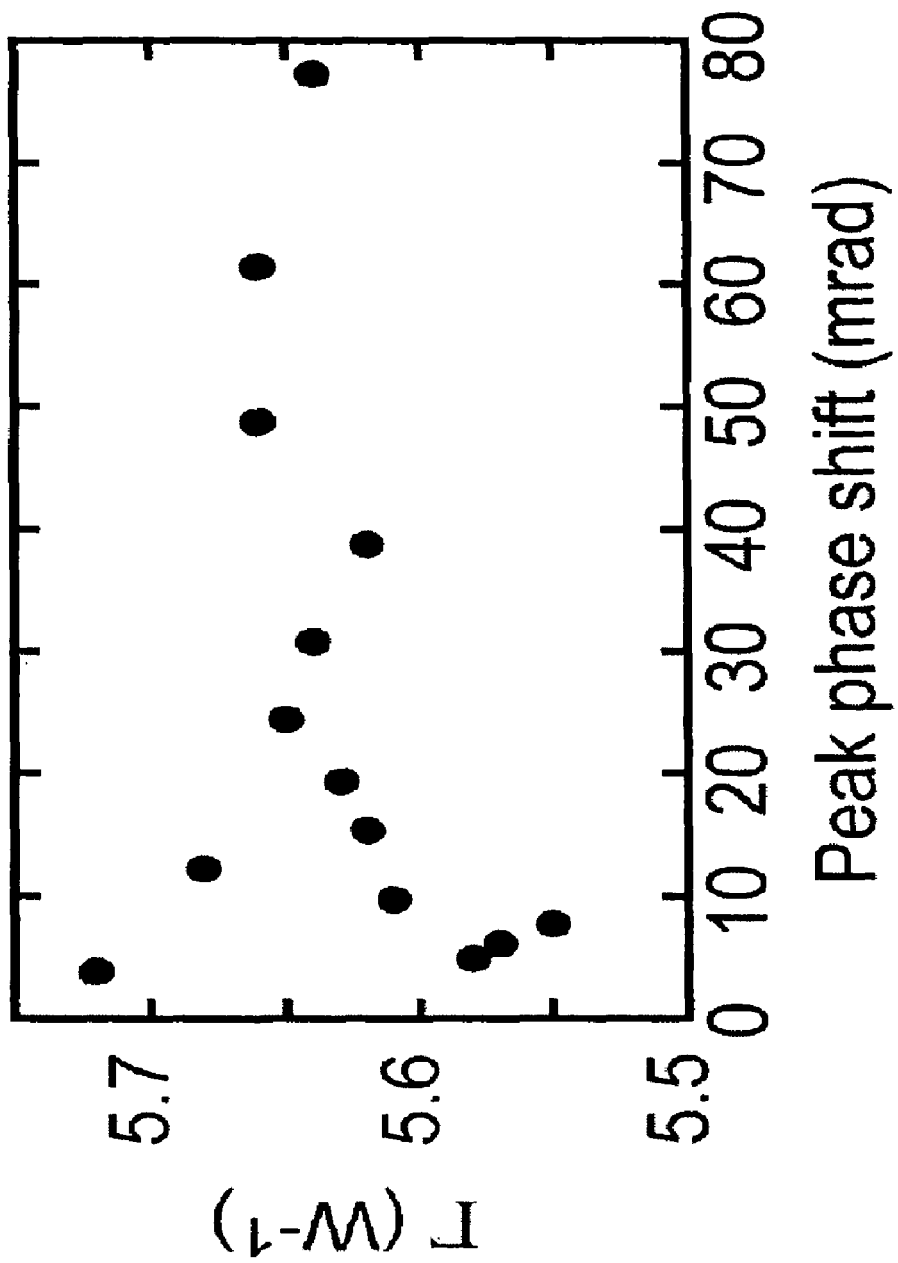
FIG. 4 is a scatter plot showing determined value of the nonlinear coefficient of the fiber as a function of the peak nonlinear phase shift induced by XPM wherein the rightmost data point corresponds to the fit presented in FIG. 3a while the leftmost data point corresponds to the fit presented in FIG. 3b.

The wavelength of the monochromatic probe was set such that the interleaver 240 provides a substantially constant transmission for the spectral modes of the phase modulated source having a wavelength higher than that of The determined value of $\Gamma$ is plotted in FIG. 4 and shows the consistency of the measurement, even when the phase shift is in the 1 milliradian range. The average value of $\Gamma$ over this range is 5.62 $W^{-1}$, with a standard deviation of 0.04 $W^{-1}$. This value is in good agreement with the values previously determined on the same fiber with two other techniques (See, e.g., C. Dorrer, "Direct Measurement of the Nonlinear Coefficient Of An Optical Fiber Using Linear Optical Sampling, Electron. Lett., 41, pp. 8-10, 2005), noting that this determination is, as in all other techniques, sensitive to the knowledge of the actual power coupled in the fiber.

The nonlinear coefficient of the fiber was also measured when minimizing the nonlinear phase shift, which happens in a fiber with random birefringence when the pump and probe are launched with orthogonal polarization states. This leads to the value $\alpha=1$, and the XPM-induced phase shift is half the phase shift obtained when the two sources are identically polarized (it should be noted that in such fiber, all determinations of the nonlinear coefficient already includes the normalization factor equal to 8/9) (See, e.g., S. V. Chernikov and J. R. Taylor, "Measurement Of The Normalization Factor Of n2 For Random Polarization In Optical Fibers", Opt. Lett., 21, pp. 1559-1561, 1996).

Experimentally, the ratio of the maximal phase shift to the minimal phase shift was measured as 1.97 when the pump and probe are maintained at 1556 nm and 1560.7 nm respectively, but was found to decrease slowly with the wavelength separation of the two sources, reaching the value of 1.87 when the pump and probe are at 1535 nm and 1560.7 nm, respectively. This may be attributed to the increased decorrelation of the polarization states of the two sources induced by the polarization-mode dispersion of the fiber under test. For completely decorrelated polarization states, the phase shift would not depend on the polarization states of the two sources, which would lead to a value of 1 for the ratio of the maximum to the minimum phase shift.

As can be appreciated, my inventive technique allows the unambiguous determination of the nonlinear phase shift induced by a cross-phase modulation of a monochromatic source by a pump pulse. Advantageously, my technique is extremely sensitive, being able to detect phase shifts on the order of 1 milliradian.

In addition, I have developed additional inventive techniques for measuring temporal phase shifts using only intensity information in a direct, non-interferometric manner. More particularly, I have derived—in the temporal domain—an equivalent of the transport-of-intensity equation, therefore describing the evolution of the instantaneous power of the electric field in a dispersive medium. As its spatial counterpart, which can be used to measure wavefronts using intensity measurements after various amounts of diffraction, the temporal transport-of-intensity equation so derived allows the measurement of temporal phase shifts using only intensity information in a direct non-interferometric way. Advantageously, my inventive technique may be applied to the measurement of nonlinear phase shifts induced by self-phase modulation and cross-phase modulation, and the nonlinear coefficient of a highly nonlinear fiber may be accurately determined as well.

Figure 5:
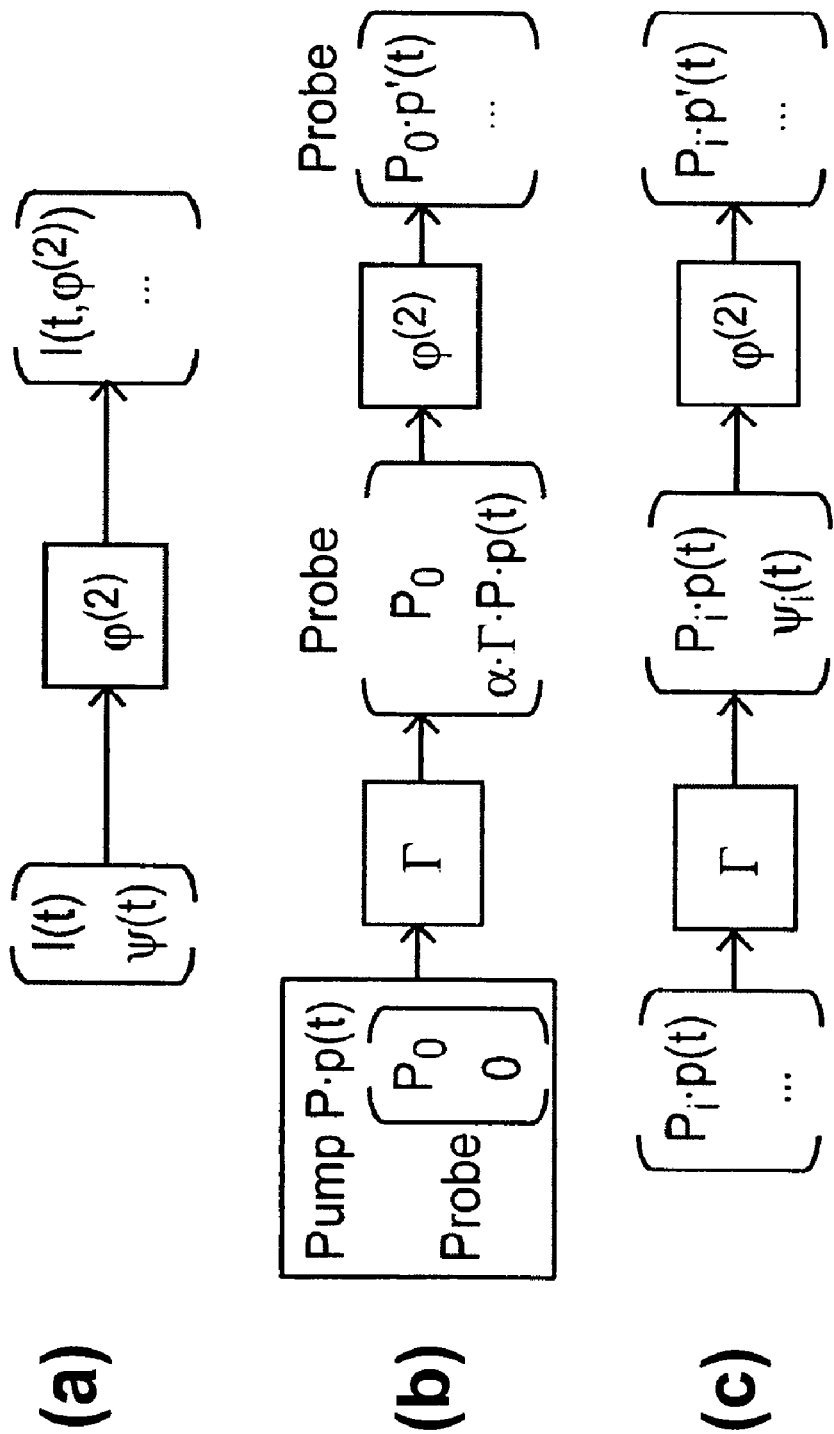
FIG. 5(a) shows the mathematical notation for the derivation of the temporal transport-of-intensity equation.
FIG. 5(b) shows the mathematical notation for the determination of the nonlinear coefficient of a medium using cross phase modulation and dispersive propagation.
FIG. 5(c) shows the mathematical notation for the determination of the nonlinear coefficient of a medium using SPM and dispersive propagation.

To fully understand this additional technique, and with reference to FIG. 5(a), a concise derivation of the transport-of-intensity equation in one dimension may be obtained using Wigner functions, with the notations shown in that FIG. 5(a). The Wigner function of the temporal electric field is by definition $$W(t, \omega) = \int E\left(t - \frac{t'}{2}\right) \cdot E^*\left(t + \frac{t'}{2}\right) \cdot \exp(-i\omega t) \cdot dt' \quad [2]$$

The temporal intensity of the field can be obtained as the integral $$I(t) = \int W(t, \omega) \cdot \frac{d\omega}{2\pi},$$

while the temporal phase $\psi$ obeys the equation $$\frac{\partial \psi}{\partial t} = -\frac{\int \omega \cdot W(\omega, t) \cdot d\omega}{I(t)}.$$

The Wigner function before and after propagation in the dispersive element with second order dispersion $\phi^{(2)}$, respectively W and W', satisfy $W'(t,\omega) = W(t - \phi^{(2)}\omega, \omega)$. Calling $I(t, \phi^{(2)})$ the intensity after propagation in the dispersive element, the variation of the intensity with respect to the dispersion is calculated as:

$$\frac{\partial I}{\partial \phi^{(2)}}(t, \phi^{(2)}) = \quad [3]$$
$$\int \frac{\partial W}{\partial \phi^{(2)}}(t - \phi^{(2)}\omega, \omega) \frac{d\omega}{2\pi} = -\int \omega \frac{\partial W}{\partial t}(t - \phi^{(2)}\omega, \omega) \cdot \frac{d\omega}{2\pi}$$

Expressing the previous relation at $\phi^{(2)}=0$ leads to:

$$\frac{\partial I}{\partial \phi^{(2)}}(t, 0) = \frac{\partial}{\partial t}\left[I(t) \cdot \frac{\partial \psi}{\partial t}\right] \quad [4]$$

This equation 4, which will call the temporal TIE, links the variations of the temporal intensity due to dispersive propagation to the temporal intensity and temporal phase. This result also expresses the phase-to-amplitude modulation conversion due to small dispersion for an arbitrary electric field.

As is known, phase-to-amplitude modulation conversion by chromatic dispersion (See, e.g., A. R. Chraplyvy, R. W. Tkach, L. L. Bul and R. C. Alferness, "Phase Modulation To Amplitude Modulation Conversion of CW Laser Light in Optical Fibres", *Electron. Lett.*, 22, pp. 409-411, 1986) is the basis of some chromatic dispersion and zero-dispersion wavelength measurement schemes, but it is usually treated by considering harmonics of the phase modulation, which makes it cumbersome to apply when the phase modulation is not sinusoidal. And while other applications of my inventive techniques involving the temporal TIE could be discussed, we focus herein on the detection of temporal phase shifts induced by self-phase modulation (SPM) or cross phase modulation (XPM).

With reference to FIG. 5(b), for XPM, a monochromatic laser having average power $P_0$ and a pump pulse with average power P and instantaneous power $P \cdot p(t)$ propagate in a nonlinear medium with nonlinear coefficient $\Gamma$. After such propagation, the field around the optical frequency of the monochromatic laser has power $P_0$ and phase $\alpha \cdot \Gamma \cdot P \cdot p(t)$, the latter being the phase shift induced by the pump ($\alpha$ depends upon the relative polarization states of the two sources). This field propagates in an element with second order dispersion $\phi^{(2)}$, and leads to the instantaneous power $P_0 \cdot p'(t)$.

Using the temporal TIE with the left-hand side expressed as the finite difference $$P_0 \cdot \frac{p'(t) - 1}{\phi^{(2)}},$$

one obtains:

$$p'(t) - 1 = \alpha \cdot \Gamma \cdot \phi^{(2)} \cdot P \cdot \frac{\partial^2 p}{\partial t^2}(t) \quad [5]$$

As can be appreciated, the relative changes in the instantaneous power of the probe are therefore proportional to the second order derivative of the pump power. The proportionality factor, which can be determined simply by comparing the measured instantaneous power of the probe after propagation and the calculated second order derivative of the measured instantaneous power of the pump, leads to the direct determination of $\alpha \cdot \Gamma$. Advantageously, and according to my inventive technique, this is a direct easy-to-implement non-interferometric measurement of arbitrary nonlinear phase shifts, which benefits from the high peak power of pulsed sources.

Experimentally, it is required to temporally resolve p(t) and p'(t), for example using a sampling oscilloscope or a nonlinear cross-correlation. While the experimental setup presented herein directly measures p'(t), it is likely that the sensitivity could be further enhanced by directly detecting the relative temporal changes p'(t)−1.

Turning now to FIG. 5(c), for SPM, a pulsed source is sent in the nonlinear medium with two different powers $P_1$ and $P_2$. The instantaneous power before the nonlinear medium is $P_i \cdot p(t)$, the power and phase after the medium are respectively $P_i \cdot p(t)$ and $\psi_i(t)$ (including the unknown phase of the initial pulse), and the instantaneous power after the dispersive element is $P_i \cdot p'_i(t)$, where the index i is either 1 or 2. The temporal TIE leads to two equations such as:

$$P_i \cdot \frac{p'_i(t) - p(t)}{\varphi^{(2)}} = \frac{\partial}{\partial t}\left[P_i \cdot p(t) \cdot \frac{\partial \psi_i}{\partial t}(t)\right] \quad [6]$$

Using the relation $\psi_2(t) - \psi_1(t) = \Gamma \cdot (P_2 - P_1) \cdot p(t)$ for SPM and the simplification $$\frac{\partial}{\partial t}\left[p \cdot \frac{\partial p}{\partial t}\right] = \frac{1}{2} \cdot \frac{\partial^2 p^2}{\partial t^2},$$

the following relationship results:

$$p'_2(t) - p'_1(t) = \frac{\Gamma}{2} \cdot \varphi^{(2)} \cdot (P_2 - P_1) \cdot \frac{\partial^2 p^2}{\partial t^2}(t) \quad [7]$$

The changes in the instantaneous power of the pulse after propagation in the nonlinear medium and the dispersive medium are therefore directly linked to the second order derivative of the square of the instantaneous power of the initial pulse. The proportionality coefficient leads to the value of Γ characterizing the nonlinear medium. Experimentally, it is only required to temporally resolve p(t), $p'_1(t)$ and $P'_2(t)$.

Figure 6:
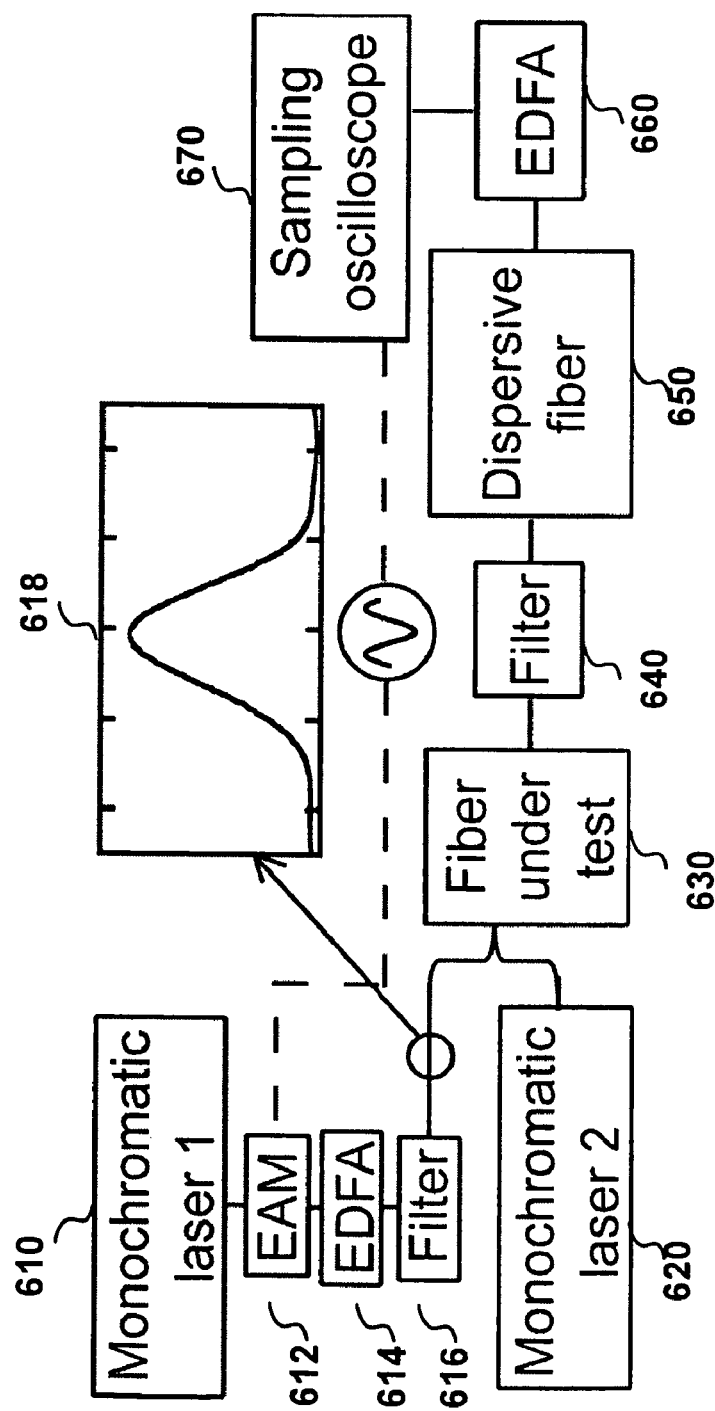
FIG. 6 is a schematic illustrating an experimental setup for determination of a nonlinear coefficient of an optical fiber under test via SPM, according to the present invention wherein the inset represents the measured instantaneous power of the carved pulse in a in a 100 ps window.

Experimental measurements of XPM and SPM-induced nonlinear phase shifts using the TIE were performed using the setup shown in FIG. 6. With reference to that FIG. 6, a monochromatic laser 610 operating at 1556 nm was directed to an electroabsorption modulator 612 (EAM) driven at 10 GHz. The carved output from the EAM 612 was amplified in an erbium-doped fiber amplifier (EDFA) 614 and subsequently filtered through the effect of filter 616. The instantaneous power p(t) of the pulsed source in a 100 ps window is shown in inset, 618.

For XPM measurements, the pulsed source was combined with a second monochromatic laser 620 operating at 1560 nm and acting as the probe, and the combined sources were directed into a 600-meters nonlinear fiber under test 630. The output of the fiber was filtered around 1560 nm through the effect of filter 640 and subsequently directed into a length of dispersive fiber 650. After chromatic dispersion resulting from traversing the dispersive fiber 650, the probe light is further amplified by an EDFA 660 and subsequently sampled by a 30 GHz sampling oscilloscope 670.

For SPM measurements, the pump pulse produced by laser 610 is directed to a nonlinear fiber under test 630 followed by various dispersive fibers 650, followed by the EDFA 660 and then sampled/detected by oscilloscope 670. The oscilloscope 670 is also used to measure the carved output from the EAM 612, p(t).

At this point, second order derivatives $$\frac{\partial^2 p}{\partial t^2} \text{ and } \frac{\partial^2 p^2}{\partial t^2}$$

were calculated by two successive differentiations after numerical low-pass filtering. The nonlinear coefficient was respectively obtained using a linear fit of the measured changes p'(t)−1 and $p'_2(t) - p'_1(t)$ versus the corresponding second order derivatives, following Eq. 5 and Eq. 7.

In XPM experiments, the polarization state of the pump laser 610 was aligned to that of the probe laser 620 by maximizing the nonlinear phase shift, which is known to give α=2. The dispersive fiber 650 was either a standard singlemode fiber (SSMF), a dispersion compensating fiber (DCF), or the combination of these two fibers. Their second order chromatic dispersion, including that of the EDFA 660, was determined to be respectively −11.96 ps², 21.70 ps² and 13.13 ps² using a time-of-flight technique implemented with a mode-locked laser and a spectral filter.

Figure 7:
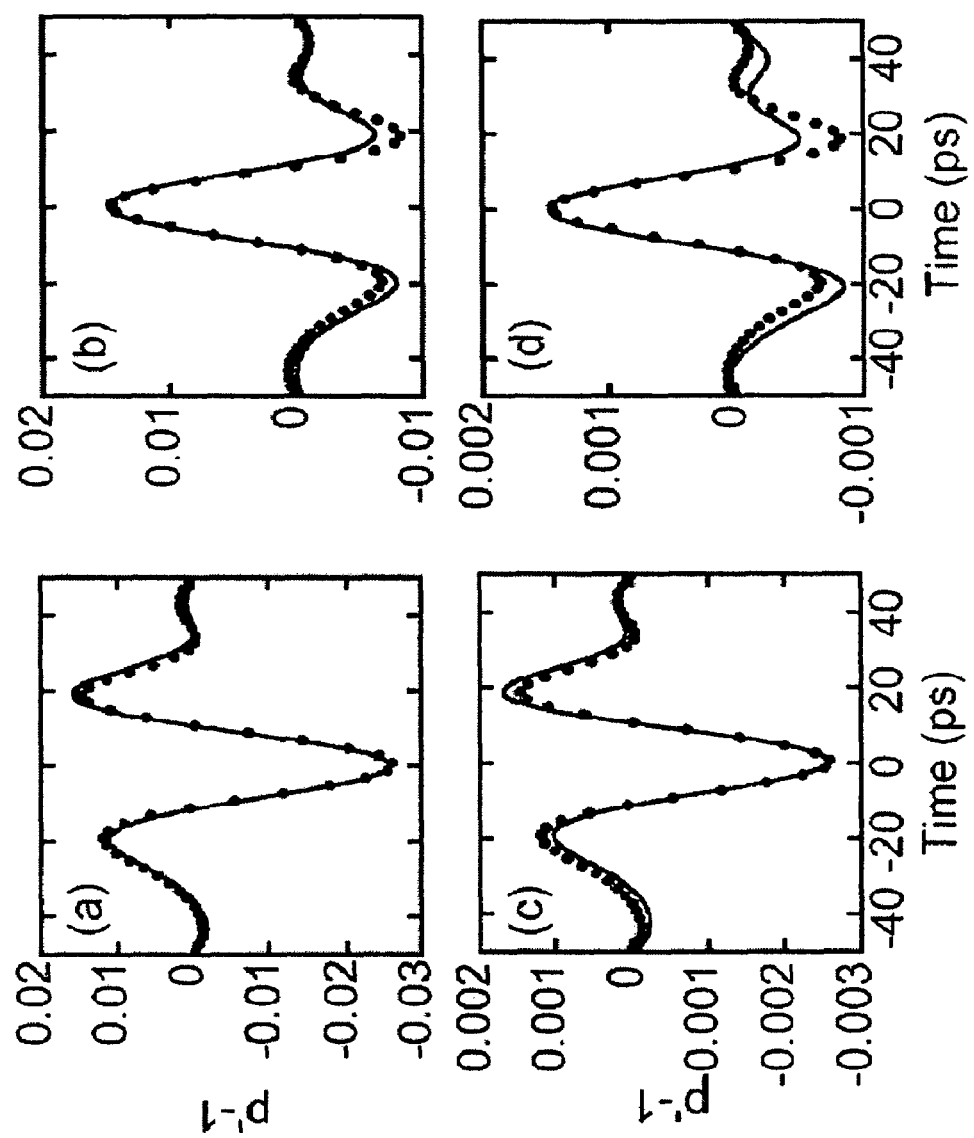
FIG. 7(a-d) are graphs showing measured p'(t)−1 (continuous line) and fitted $$\frac{\partial^2 p}{\partial t^2}$$

With reference now to FIG. 7, there is shown the time-resolved relative change of the probe p'(t)−1 and the fitted second order derivative of the power of the pump $$\frac{\partial^2 p}{\partial t^2}(t)$$

for average pump power into the nonlinear fiber equal to 5.7 dBm and −4.3 dBm (resulting in peak nonlinear phase shift respectively equal to 14 mrad and 1.4 mrad). In each case, the results obtained using the DCF and the SSMF as the dispersive element are plotted. The excellent agreement in all cases shows that phase shifts in the milliradian range can be measured accurately.

The values of the nonlinear coefficient were found to be 5.60 W⁻¹, 5.53 W⁻¹ and 5.63 W⁻¹ when respectively using the DCF, SSMF and the combination of DCF and SSMF. For a given fiber, the determination of the nonlinear coefficient was consistent for powers ranging from 5.7 dBm to −4.3 dBm, i.e. down to milliradian phase shifts, with standard deviation smaller than 0.1. The value of the nonlinear coefficient compares well with the previously determined values of 5.92 W⁻¹ and 6.09 W⁻¹ using two other techniques (See., e.g, C. Dorrer, "Direct Measurement of the Nonlinear Coefficient of An Optical Fiber Using Linear Optical Sampling", Electron. Lett., 41, pp. 8-10, 2005. The lower values obtained with these XPM-based measurements can be explained by a lower value of α due to the decorrelation of the polarization states of the two sources because of polarization-mode dispersion in the fiber. As in all other techniques, the accuracy of the determination of the nonlinear coefficient is also linked to the accuracy of the knowledge of the power launched into the fiber, and the different determinations could also be explained by a 0.3 dB uncertainty in the determination of such power.

FIG. 8 displays results related to SPM. With reference to that FIG. 8, one can observe the changes of the pump $p'_2(t) - p'_1(t)$ and the fitted second order derivative of the squared instantaneous power $$\frac{\partial^2 p^2}{\partial t^2}(t)$$

are plotted for $P_2-P_1$ equal to 32 mW, the dispersive element being either the DCF or the SSMF. Good general agreement is obtained, although some local discrepancies appear. These discrepancies are attributed to the detection system. It should be noted that in XPM measurements, p and p' are affected identically by the response of the detection system, and Eq. 5 is equivalent to $$p' \otimes R(t) - 1 = \alpha \cdot \Gamma \cdot \varphi^{(2)} \cdot P \cdot \frac{\partial^2 p \otimes R}{\partial t^2}(t)$$

where $\otimes$ denotes a convolution, p$\otimes$R and p$\otimes$R being the quantities experimentally measured by the detection system with response R.

In SPM measurements, $p^2$ and $p'_2-p'_1$ are affected differently because of the squaring process, and Eq. 7 is not equivalent to $$p' \otimes R_2(t) - p'_1 \otimes R(t) = \frac{\Gamma}{2} \cdot \varphi^{(2)} \cdot (P_2 - P_1) \cdot \frac{\partial^2 (p \otimes R)^2}{\partial t^2}(t)$$

where $p'_1 \otimes R$, $p'_2 \otimes R$ and p$\otimes$R are the quantities experimentally measured. It therefore appears that the response of the detection system should not impair the XPM measurements, but can affect the accuracy of the SPM measurements. The values of $\Gamma$ obtained in the SPM measurements using the previously mentioned value of $P_2-P_1$ are respectively 6.13 $W^{-1}$, 5.48 $W^{-1}$ and 6.04 $W^{-1}$ when respectively using the DCF, SSMF and the combination of DCF and SSMF.

As can now be appreciated, with this derivation of a temporal transport-of-intensity equation linking the changes in the instantaneous power of the electric field due to chromatic dispersion to the instantaneous values of the power and phase of the field has been derived. An application to the measurement of nonlinear phase shifts induced by XPM and SPM with sensitivity better than 1 milliradian has been presented.

With these discussions in place, and with reference now to FIG. 10, there is shown a flowchart that generally depicts my inventive method(s). More specifically, and as described in detail earlier, a temporal phase is first introduced into an optical signal (block 910). This optical signal is then converted from a phase modulation into an intensity modulation (block 920) and the resulting intensity modulated signal is measured (block 930). From these intensity measurement(s), the phase modulation is determined (block 940).

At this point, while we have discussed and described our invention using some specific examples, our teachings are not so limited. Accordingly, our invention should be only limited by the scope of the claims attached hereto.

What is claimed is:

1. A method for determining a phase shift of an optical signal, said method comprising the steps of:
    inducing, a temporal phase shift into the optical signal;
    converting, the phase modulation of the optical signal into an intensity modulation;
    measuring, the intensity modulated signal; and
    determining, the phase shift of the optical signal from the intensity measurement(s).

2. The method of claim 1, wherein said inducing step further comprises the step(s) of:
    interacting nonlinearly, a pump signal with the optical signal in a nonlinear medium.

3. The method of claim 2, further comprising the steps of:
    determining, the instantaneous power of the pump signal; and
    determining, a nonlinear property of the nonlinear medium.

4. The method of claim 1, wherein said converting step comprises the step of:
    filtering, the phase modulated optical signal with a filter having a known set of characteristics; and said phase shift determining step uses the known set of filter characteristics.

5. The method of claim 4, wherein said known set of filter characteristics includes spectral amplitude and phase of the transmission of the filter.

6. The method of claim 1 wherein said converting step comprises the step of:
    propagating the optical signal in a dispersive medium having a known set of dispersive characteristics; and said phase shift determining step uses the known dispersive characteristics.

7. The method according to claim 1, wherein said inducing step further comprises the steps of:
    propagating nonlinearly, the optical signal in a nonlinear medium; and
said converting step further comprises the steps of:
    propagating the optical signal in a dispersive medium having a known set of dispersive characteristics and said phase shift determining step uses the known dispersive characteristics.

8. The method according to claim 1, wherein said phase shift determining step proceeds according to the following relationship:

$$\frac{\partial I}{\partial \phi^{(2)}}(t, 0) = \frac{\partial}{\partial t}\left[I(t) \cdot \frac{\partial \psi}{\partial t}\right]$$

where
    I is the intensity of the optical signal;
    $\psi$ is the phase of the optical signal;
    $\phi^{(2)}$ is the second order dispersion of the medium; and
    is the time.

9. The method of claim 1, wherein the phase shift determining step proceeds according to the following relationship:

$$P'(t) = P_0 \cdot |\tau(0)|^2 \cdot [1 - 2 \, Im[\tilde{\phi}_\tau(t)]/\tau(0)]$$

where
    P' is the measured power after the filter
    $P_0$ is the average power
    $\tau(0)$ is a characteristic of the filter
    $\tilde{\phi}$ is the Fourier transform of the phase modulation $\phi$
    $\tilde{\phi}_\tau$ is the Fourier transform of $\tilde{\phi} \cdot \tau$
    $\tau$ is the complex spectral transmission of the filter
    t is the time variable.

* * * * *